United States Patent [19]

Tanaka

[11] Patent Number: 4,915,965

[45] Date of Patent: * Apr. 10, 1990

[54] PROCESS FOR PRODUCTION OF ENCAPSULATED FOODSTUFF CONTAINING DUNALIELLA ALGAE

[76] Inventor: Yoshio Tanaka, 22 Banchi, Yamaguchi-cho, Gifu-shi, Gifu-ken, Japan

[*] Notice: The portion of the term of this patent subsequent to Apr. 3, 2007 has been disclaimed.

[21] Appl. No.: 225,417

[22] Filed: Jul. 28, 1988

[30] Foreign Application Priority Data

Feb. 25, 1988 [JP] Japan ................................. 63-40754
Feb. 25, 1988 [JP] Japan ................................. 63-40755

[51] Int. Cl.$^4$ ................................................. A23L 1/42
[52] U.S. Cl. ..................................... 426/282; 426/72; 426/98; 426/103; 426/138; 426/443
[58] Field of Search ..................... 426/72, 89, 98, 103, 426/648, 138, 443

[56] References Cited

U.S. PATENT DOCUMENTS 4,143,162  3/1979  Tanaka .................................. 426/89

FOREIGN PATENT DOCUMENTS 56-113269  9/1981  Japan.

OTHER PUBLICATIONS

Finney et al., "Use of Algae Dunaliella as a Protein Supplement in Food", Ceral Chem. 61(5), pp. 402–406.
Ben–Amotz et al, "Goycerol, B–Carotene and Dry Algal Meal Production by Commercial Cultivation of Dunaliella", Algae Biomass, pp. 604–609, (1980).
Ben–Amotz et al, "Glycerol and B–Carotene Metabolism in the Halotolerant Alga Dunaliella: A Model System for Biosolar Energy Conversion", TIBS, pp. 297–299, (Nov. 1981).
Ben–Amotz et al, "Accumulation of B–Carotene in Halotolerant Algae Purification and Characterization of B–Carotene–Rich Globules form Dunaliella Bardawil (Chloriphyceae)", *Zinc Adsorption and Transport*, pp. 529–535, (Jun. 1982).
Fried et al, "Lipid Composition of the Halotolerant Alga, Dunaliella Bardawil", *Biochimica et Biophysica Acta*, vol. 713, pp. 419–426, (1982).

*Primary Examiner*—Marianne Cintins
*Assistant Examiner*—Evan Federman
*Attorney, Agent, or Firm*—Browdy and Neimark

[57] ABSTRACT

Dunaliella algae, which is rich in various kind of physiologically active ingredients, especially $\beta$-carotene, can be utilized in the form of dried powder. Dried powder of Dunaliella algae is granulated together with other materials to make a granulation and the granulation is encapsulated in a hard capsule. Dried powder of Dunaliella algae is also suspended in an emulsifier along with other materials to form a suspension and the suspension is encapsulated in a soft capsule.

3 Claims, No Drawings

PROCESS FOR PRODUCTION OF ENCAPSULATED FOODSTUFF CONTAINING DUNALIELLA ALGAE

BACKGROUND OF THE INVENTION

The present invention relates to health food containing Dunaliella algae and a process for the production thereof. More particularly, the present invention relates to encapsulated food obtained by utilizing various kinds of active components included in Dunaliella algae, especially β-carotene present in the algae without destroying it, as well as to a process for producing such food.

It has been well known that Chlorella algae, which belong to the species of unicellular Chlorophyceae, are used for the purposes of food additives or health food in the form of a tablet by utilizing extracted solution from or dried powder of the algae. It has also been known that Dunaliella algae produce a lot of βcarotene therein when the algae are grown in a culture fluid containing a high concentration of saline and a small amount of nitrogen under the intense sunbeams and other appropriate conditions. It is public knowledge in the art that natural β-carotene derived from Dunaliella algae is utilized in the form of a suspension in vegetable oil as natural coloring agents for food, cosmetics, feed and the like as additives for health food and as a material for regulating vital functions such as a nourishing diet supplement. However, no practical proposal had been made concerning the method of fully utilizing Dunaliella algae per se for health-oriented food without destroying the β-carotene.

Dunaliella algae contain proteins, lipids, sugars, mineral components such as iron and calcium, vitamins such as provitamin A and vitamin B group compounds and a variety of other physiologically active ingredients. Among these nutrients, β-carotene, one of provitamin A group compounds, is easily oxidizable because it contains a conjugated double bond chains. This presents a serious problem in the manufacture of health food containing Dunaliella algae. It has therefore been strongly desired to develop a method by which the algae can be processed without destroying the natural β-carotene, and the product obtained can also be preserved in a stable state.

The present inventor actively investigated possible solutions for the aforementioned problems. As a result of such investigation, he has completed the present invention.

SUMMARY OF THE INVENTION

It is an object of the present invention to provide hard-capsuled food containing Dunaliella algae wherein 300 parts by weight of granules including from about 10 to 240 parts by weight of dried powder of Dunaliella algae are encapsulated either in a hard capsule or a soft capsule which is impermeable to light.

It is another object of this invention to provide a process for producing a hard-capsuled food containing Dunaliella algae which comprises the following steps: adding cyclodextrin to dried powder of Dunaliella algae to form a mixture; further adding to 100 parts by weight of the mixture from about 3.50 to 4.50 parts by weight of a lubricant, from about 0.10 to 0.25 parts by weight of an antioxidant and from about 35.50 to 40.60 parts by weight of a binder; blending these materials; granulating the binder-containing mixture; thus obtained in the form of powdery granules and encapsulating 300 parts by weight of said granules including from about 10 to 240 parts by weight of said powder in each of hard capsules.

It is a further object of the invention to provide a soft-capsuled food containing Dunaliella algae which comprises the following steps: blending dried powder of Dunaliella algae, animal and/or vegetable oil and an antioxidant; further blending the mixture with an emulsion consisting of natural wax, a emulsifier and water, and encapsulating the resultant emulsified suspension in light-impermeable soft capsules, thereby keeping the β-carotene included in the encapsulated food in a stable condition.

It is a further object of the invention to provide a process for producing soft-capsuled food containing Dunaliella algae wherein stirring and emulsifying treatments to obtain a suspension of Dunaliella algae and encapsulating treatment of the suspension are carried out in the absence of air, either in vacuo or under a nitrogen atmosphere, so as not to destroy the β-carotene present in the algae.

DETAILED DESCRIPTION OF THE PREFERRED EMBODIMENTS OF THE INVENTION

The dried powder of Dunaliella algae used as a starting material in the present invention means such powder as is obtained by the process comprising the steps of:

(1) preliminarily removing about 50% by weight of water gradually from the culture fluid of Dunaliella algae by a dehydrator such as a centrifuge so as to make it easier to dry the fluid;

(2) adding to the dehydrated culture fluid a sufficient amount of each of an anti-caking agent, preferably dextrin, an antioxidant, preferably vitamin E, and other suitable additives and (3) spray-drying, vacuum-drying or freeze-drying the mixture thus prepared.

Dunaliella algae are morphologically characterized by the absence of a hard cell wall composed of polysaccharides though the algae have a thin cell membrane. Other green algae, such as Chlorella algae, have both a cell wall and a cell membrane. It is also characteristic of Dunaliella algae that they contain a large amount of β-carotene. Typical examples of Dunaliella employed in the present invention include *Dunaliella bardawil* and *Dunaliella saliva*.

In accordance with the present invention, in the case of hard-encapsuled food, from about 10 to 240 parts by weight (for example, from about 10 to about 240 mg per capsule) of dried powder of Dunaliella algae is included in 300 parts by weight (for example, 300 mg per capsule) of prepared granules to be encapsulated in a hard capsules. In order to obtain a mixture of the dried powder and cyclodextrin, the latter is used in an amount ranging from 15 to 50 parts by weight per 100 parts by weight of the former. The ratio of each of other additive materials per 100 parts by weight of the about mixture is as follows;

lubricant—from about 3.50 to about 4.50 parts by weight antioxidant—from about 0.10 to about 0.25 parts by weight binder—from about 35.50 to about 40.60 parts by weight When a hard capsule contains 300 parts by weight (for example, 300 mg) of encapsulated granules, the maximum content of dried powder of Dunaliella algae becomes 80%. From the viewpoint of health, it would be desirable to eat two or three capsules of the granulated food containing Dunaliella algae a day. Especially if the food contains a large amount of β-carotene, its full usefulness can be secured.

In the case of soft-capsuled food, the prepared suspension to be encapsulated in soft capsules may include the following ingredients per capsules:

| Emulsion | |
|---|---|
| Natural wax | from about 1 to 10 parts by weight |
| Emulsifier | from about 1 to 10 parts by weight |
| Dried powder of Dunaliella algae | from about 10 to 240 parts by weight |
| Animal and/or vegetable oil | from about 10 to 260 parts by weight |
| Antioxidant | from about 1 to 10 parts by weight |
| Total (suspension) | 300 parts by weight |

When a soft capsule contains 300 parts by weight (for example, 300 mg) of encapsulated suspension, the maximum content of the dried powder becomes 80%. It would be fully good for health to eat two or three capsules of the suspension food containing Dunaliella algae per day.

Examples of suitable antioxidants which can be used in the present invention include vitamin C and vitamin E. Examples of suitable binders are sugars, preferably reducing maltose. Examples of lubricant include talc and ester of sucrose and fatty acid, the latter more advantageous than the former. Examples of cyclodextrin (the term cyclodextrin is hereinafter abbreviated as "CD".) include α-CD β-CD, γ-CD, ε-CD, polymer-CD and CD powder sugar.

Examples of animal or vegetable oil which can be used in the invention of soft-capsuled food include corn oil, palm oil and olive oil. Examples of natural wax include lanolin and yellow bee wax. Examples of emulsifier include esters of glycerin and fatty acids and monoglycerides.

The viscosity of a suspension is advantageously from about 7000 to 8000 cps; that of emulsified liquid is advantageously about 2000 cps.

EXAMPLE 1

To 100 parts by weight of dried powder of Dunaliella algae was added 25 parts by weight of cyclodextrin and both were blended by a Model-V mixer for about five minutes. To 100 parts by weight of the resultant mixture were added 0.2 parts by weight of vitamin E as an antioxidant and 37 parts by weight of dried thick malt syrup of reducing maltose as a binder to form a mixture. The mixture thus obtained was granulated in the form of fine particles by a roller converter and the resultant granules were encapsulated in light-impermeable hard capsules to obtain a food product. It was confirmed that the content of dried powder of Dunaliella algae in the food encapsulated in a hard capsule was about 58.3%.

EXAMPLE 2

10 mg of monoglyceride and 10 mg of yellow bees wax were stirred at a temperature of about 60° C. for about fifteen minutes to obtain an emulsified liquid (2000 cps).

The resultant emulsified liquid, 100 mg of dried powder of Dunaliella algae, 2 mg of vitamin E and 178 mg of corn oil were stirred by a vacuum emulsifying machine or a puddling mixer at 700 rpm and then were further stirred by a homogenizing mixer at 100 rpm to form a suspension. The suspension was encapsulated by the usual method under nitrogen gas in soft capsules which were made of a soft gelatin capsule base colored with caramel in order to obtain of soft-capsule food products.

The present invention has made it practicable to obtain novel encapsulated health food containing active ingredients of Dunaliella algae without destroying β-carotene in dried powder of the algae or without gradually diminishing the β-carotene content. In other words, the present invention has produced remarkably good results of utilizing naturally occurring β-carotene with keeping its activity and such results could not be attained by prior art.

What is claimed is:

1. A process for the production of foodstuffs containing Dunaliella algae encapsulated in a hard capsule comprising the following steps:
   adding cyclodextrin to dried powder of Dunaliella algae in an amount so that the ratio of said cyclodextrin to said powder is from 15–50 parts by weight to 100 parts by weight;
   stirring and blending said cyclodextrin and said powder in a mixer;
   adding, to 100 parts by weight of the mixture of cyclodextrin and said powder, from 0.10 to 0.25 parts by weight of an antioxidant and selected from the group consisting of vitamin C and vitamin E, from 3.50 to 4.50 parts by weight of a lubricant selected from the group consisting of talc and esters of sucrose with a fatty acid; and from 35.50 to 40.60 parts by weight of a binder selected from the group consisting of sugars;
   blending said materials to make a mixture;
   granulating said mixture in the form of granules; and
   encapsulating said granules in a light-impermeable hard capsule.

2. A process for the production of a foodstuff containing Dunaliella algae in a soft capsule comprising the following steps:
   blending from 1 to 10 parts by weight of a natural wax selected from the group consisting of lanolin and yellow beeswax, and from 1 to 10 parts by weight of an emulsifier selected from the group consisting of esters of glycerin with a fatty acid and monoglycerides, thereby obtaining an emulsion;
   adding to said emulsion from 10 to 240 parts by weight of dried powder of said algae, from 10 to 260 parts by weight of vegetable oil, and from 1 to 10 parts by weight of an antioxidant selected from the group consisting of vitamin C and vitamin E;
   stirring the mixture of said emulsion, said powder, said oil, and said antioxidant under vacuum to suspend the ingredients, thereby forming a suspension; and
   encapsulating 300 parts by weight of said suspension in a light-impermeable soft capsule under a nitrogen atmosphere;
   wherein, in each step, said natural wax, said emulsifier, said dried powder, said oil, and said antioxidant are in an amount that the total of the materials equals 300 parts by weight.

3. The process according to claim 1 wherein the binder is reducing maltose.

* * * * *